June 28, 1927.
E. L. BYRNS
1,633,761
COMBINATION TRUCK AND WEIGHER
Filed June 7, 1924
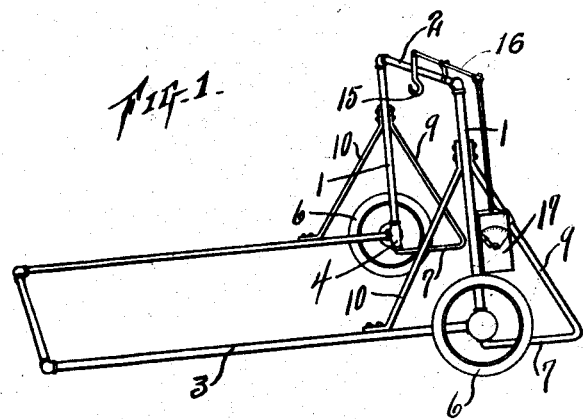
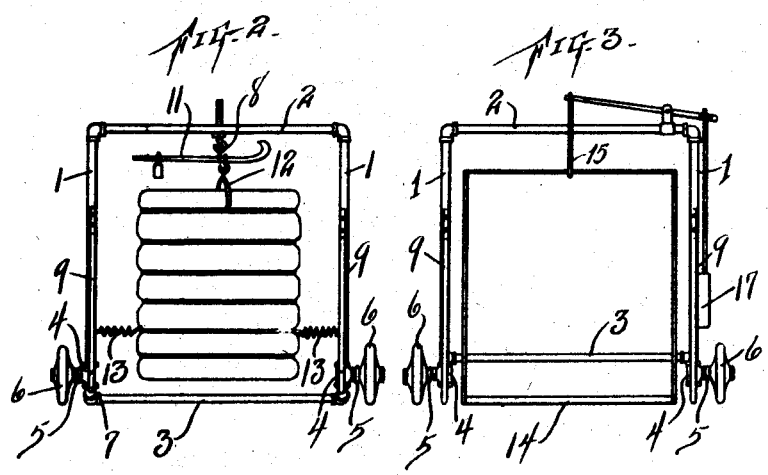
Inventor
EMETT L BYRNS.
By A. L. Jackson
Attorney Patented June 28, 1927.

1,633,761

UNITED STATES PATENT OFFICE.

EMETT L. BYRNS, OF MINERAL WELLS, TEXAS, ASSIGNOR TO G. C. BRISCOE, OF MINERAL WELLS, TEXAS.

COMBINATION TRUCK AND WEIGHER.

Application filed June 7, 1924. Serial No. 718,474.

My invention relates to truck scales or a combination truck and weigher; and the object is to provide a simple truck for carrying goods, wares, or merchandise and which is provided with weighing devices for weighing the articles to be moved. One of the advantages of the invention is that one person can take up and weigh bales of cotton and move the same to places required. The device is useful for wholesale grocery stores or ware houses or in any mercantile establishment where goods are to be weighed and moved. The device can be manufactured at small cost and can be adapted for any class of merchandise. Another considerable advantage is the saving of time and labor in handling goods when it is important to dispatch goods at the earliest possible moment. Other objects and advantages will be fully explained in the following description and the invention will be more particularly pointed out in the claims.

Reference is had to the accompanying drawings which form a part of this application.

Fig. 1 is a perspective view of a truck provided with weighing scales. Fig. 2 is a front elevation with a bale of cotton elevated for weighing, using a different kind of weighing device from that shown in Fig. 1. Fig. 3 is a front elevation, showing the lifting member raised and a carrying frame let down.

Similar characters of reference are used to indicate the same parts throughout the several views.

The truck herein shown and described comprises an upright frame consisting of the standards 1 and an arch or connecting and supporting member 2 and a lifting member 3. The lifting member 3 and the uprights 1 are shown connected by T-joints 4, but it will be understood that any other suitable connection will answer the purpose. The upright frame members are provided with spindles 5 for wheels 6 which may be provided with ball bearings of any suitable type. The spindles 5 and wheels 6 constitute pivotal bearing points for elevating and lowering of the lifting member 3. Stop members 7 are provided for holding the truck when the lifting member 3 is elevated to let the supporting member 2 low enough for the hook 8 to engage the object to be moved. The stop members 7 are provided with braces 9 to make the stop members rigid with the uprights 1. The lifting member 3 and the uprights 1 are made rigid with each other by braces 10. The stop members 7 are to be made of different lengths or proportions as may be required.

For handling bales of cotton, all that is needed are the hook 8, scales 11, and grappling hooks 12. Springs 13 or other suitable means may be employed to keep the bale of cotton or other article from swinging or interfering with the movement of the cotton bales.

For other kinds of goods or merchandise which are to be moved, a platform 14 may be employed and carried by a hook 15. This hook 15 may be suspended from a balancing beam 16 which is fulcrumed on the support 1 and operatively connected to scales 17. Either the weighing devices shown in Fig. 2 or the devices shown in Figs. 1 and 3 may be used. The weighing devices 12 may be supported from the hook 8 for weighing bales of cotton as shown in Fig. 2 or for weighing articles carried on a platform 14 as shown in Fig. 3. Bales of cotton may also be weighed by the weighing devices shown in Figs. 1 and 3, by hanging the grappling hooks 12 on the hook 15. For weighing bales of cotton no platform 14 is necessary or used. The device is operated by the lifting member 3 and is operated as an ordinary push cart in moving from place to place. The advantage of this device is that the article to be weighed and transported may be suspended and moved by the cross member 2 directly over the spindles 5 so that the operator can handle articles of great weight,—500 pounds and more, with very little effort.

In operation, the truck or the upright may be tilted forward past the vertical position until the stops 7 come against the ground or platform so that the hook of the truck will engage the object to be weighed or moved. When the handle or lifting member 3 is pressed down to the ground or floor, the uprights 1 will be tilted backwardly until the uprights 1 are tilted backwardly past the vertical center of the truck wheels 6. The truck will thus stand in either position.

What I claim is,—

1. A combination weigher and truck comprising upright frame members and spindles rigid therewith, wheels supporting said spindles, a supporting member carried by said uprights directly above said spindles, a lifting member rigid with said upright members, and weighing and carrying devices carried by said supporting member.

2. A combination weigher and truck comprising a wheeled frame including a supporting member directly over the bearings of the wheels thereof and a lifting member, rigid with said frame and a weighing and carrying device carried by said supporting member for suspending and weighing and carrying goods within said frame.

3. A combination weigher and truck comprising a wheeled frame including a supporting member directly over the bearings of the wheels thereof and a combined lifting and operating member rigid with said frame and weighing devices for weighing goods and suspending and carrying the same within said frame.

4. A combination weigher and truck comprising a wheeled frame including upright members spaced apart and a supporting member connecting the upright members and positioned directly over the bearings of the wheels thereof and a combined lifting and adjusting member for operating said truck and a device for suspending and weighing goods within said frame and for carrying the goods.

5. A combination weigher and truck comprising a wheeled frame including a supporting member and positioned directly over the bearings of the wheels thereof, a combined lifting and operating member, a stop and rest member all rigid with said frame, and weighing devices carried by said supporting member for suspending and weighing and carrying goods within said frame.

6. A combination weigher and truck comprising a tubular lifting and carrying member and an upright suspending member and T-joints connecting said members rigidly to said members, spindles rigid with said joints, wheels supporting said spindles and frame members, and weighing devices operatively connected to said upright suspending member for carrying and weighing the object to be weighed and transported.

In testimony whereof, I set my hand, this 3rd day of June, 1924.

EMETT L. BYRNS.